United States Patent Office 2,813,248
Patented Nov. 12, 1957

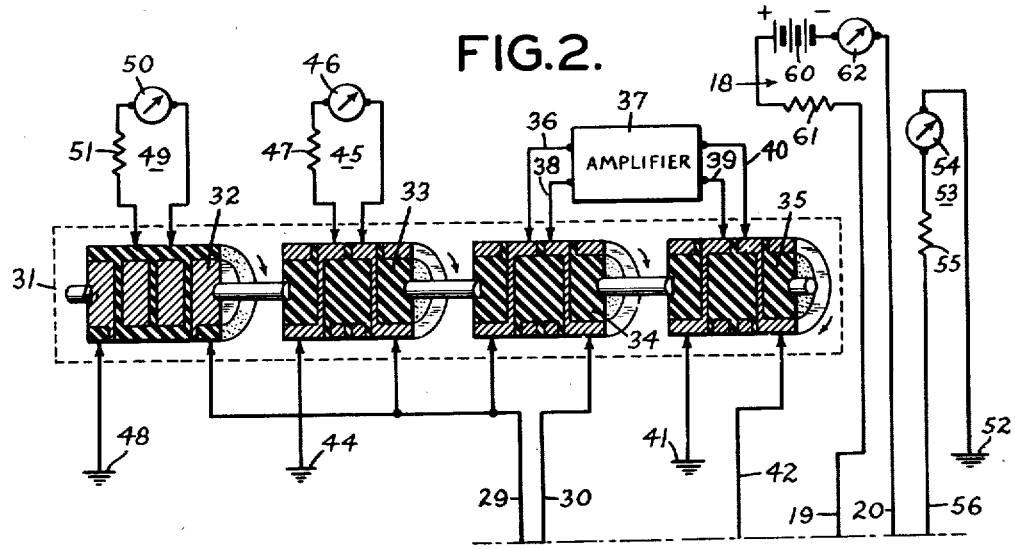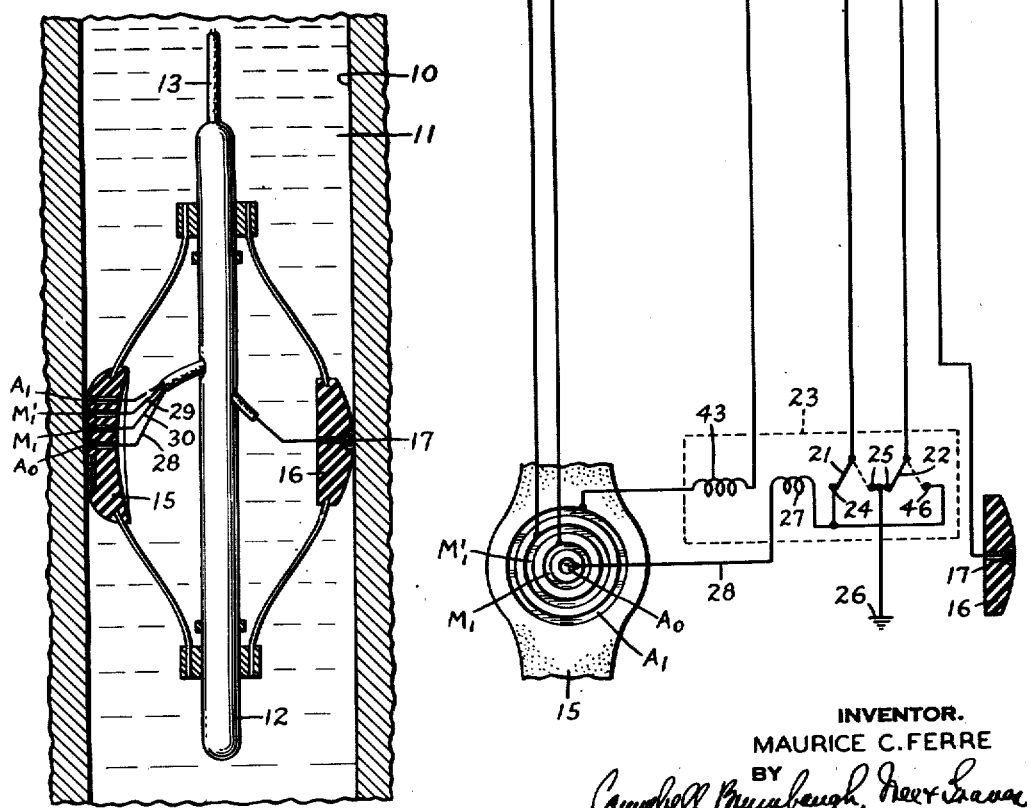

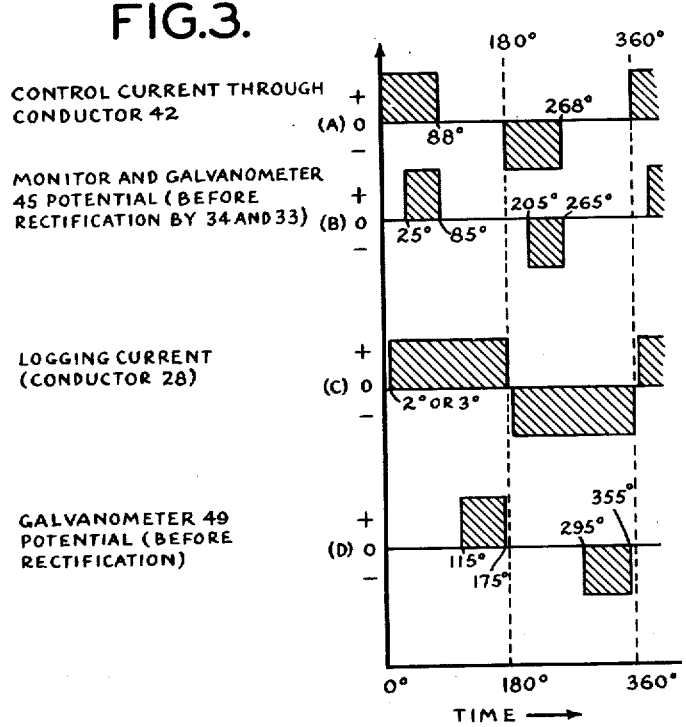
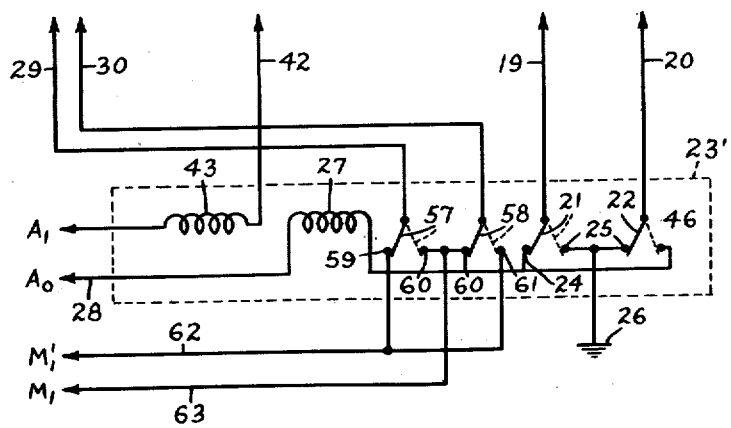

2,813,248
ELECTRICAL WELL LOGGING
Maurice C. Ferre, Ridgefield, Conn., assignor, by mesne assignments, to Schlumberger Well Surveying Corporation, Houston, Tex., a corporation of Texas Application May 21, 1953, Serial No. 356,379

8 Claims. (Cl. 324—1)

The present invention relates to electrical well logging and more particularly to new and improved methods and apparatus for obtaining one or more electrical resistivity measurements of the earth formations traversed by a bore hole.

In the present oil field practice, it is customary to make one or more logs of the electrical resistivity of earth formations traversed by a well, each log contributing significant information that is useful in determining the nature of the formations. Such logs generally involve emitting current from an electrode in the bore hole and obtaining indications of potential differences created by the current flow through the drilling liquid and the surrounding formations. So that the potential differences observed will be directly a function of the formation resistivity, the intensity of the logging current is usually kept constant. Also, alternating current is usually preferred, since it enables logs to be obtained that are not adversely affected by naturally occurring D. C. potentials in the bore hole.

However, the use of an A. C. logging current also produces some practical difficulties. When A. C. logging current is transmitted from the surface by means of a conventional cable conductor, particularly to a highly resistive medium, the capacitive coupling in the cable will decrease the intensity of the current and cause variations therein, thereby making accurate logging very difficult. If, on the other hand, the A. C. logging current is generated in the bore hole at the logging array, complex and bulky electronic equipment is required to produce a continuous, constant, known intensity logging current. Further, where a plurality of alternating current frequencies are used in a logging system to obtain a plurality of different logs simultaneously, for example, bulky filtering devices are necessary. Due to drift in frequency, bulkiness in size and occasional failure of the electronic elements, this type of equipment tends to prove troublesome in logging operations.

It is an object of the invention, accordingly, to provide new and improved well logging methods and apparatus that are free from the above-noted deficiences of the prior art.

Another object of the invention is to provide new and improved well logging methods and apparatus of the above character for obtaining, substantially simultaneously, a plurality of earth formation electrical resistivity values in a bore hole, in a simple and highly effective manner.

A further object of the invention is to provide novel and improved well logging methods and apparatus of the above character that are of particular utility for obtaining indications of formation electrical resistivities with A. C. in regions where the current path through the formations is of relatively high resistance.

These and other objects of the invention are attained by supplying D. C. from the surface to polarity reversing means in the bore hole equipment which converts the D. C. to A. C. to provide an A. C. logging current. The polarity reversing means is operated in timed relation with suitable commutator means located at the surface of the earth, which serves to rectify the A. C. potentials picked up by the bore hole equipment. The commutator means at the surface is preferably of such character that a plurality of indications of electrical resistivity may be made during separate intervals in the commutation cycle, i. e., on a time-division basis.

With this construction, it will be apparent that the downhole equipment may be very simple. Further, the adverse effect of capacitive coupling between the logging current conductor and the ground is substantially eliminated, even when the logging current passes through highly resistive formation circuits.

If desired, the A. C. potentials picked up in the bore hole may be converted to D. C. at the logging array for transmission to the surface whereby the capacitive cable effect is further reduced. This may be accomplished by second polarity reversing means synchronized with said first polarity reversing means. This construction is particularly well adapted for obtaining a plurality of sequential resistivity indications during separate intervals in the commutation cycle.

The invention may be more fully understood by reference to the following detailed description of several typical embodiments, taken in conjunction with the accompanying drawings, in which:

Fig. 1 is a view in longitudinal section of a bore hole in which is disposed typical geophysical exploring apparatus constructed in accordance with the invention;

Fig. 2 is a schematic diagram of a typical electrical circuit for the apparatus shown in Fig. 1;

Fig. 2A illustrates schematically a modified form of switching relay including means for converting A. C. potentials picked up in the bore hole to D. C. values; and Fig. 3 is a graph illustrating typical timing sequences for the various potentials and currents in the system shown in Fig. 2.

While the invention may be applied effectively to a wide variety of electrical logging techniques, it will be illustrated herein as applied to a well logging system of the type disclosed in the copending application Serial No. 214,273, filed March 7, 1951, by H. G. Doll, for "Electrical Logging of Earth Formations Traversed by a Bore Hole," now U. S. Patent No. 2,712,629, issued July 5, 1955. The bore hole portion of such a system is shown in Fig. 1 in a bore hole 10 which usually contains a conductive drilling fluid 11. It comprises a suitable housing 12 adapted to be passed through the bore hole 10 by means of an electric cable 13 which may be wound on the usual cable winch (not shown) at the earth's surface.

An insulating pad 15 is mounted resiliently on the housing 12 and is adapted to have its face pressed continuously against the wall of the bore hole as the housing 12 is moved therethrough. A back-up pad 16 may be employed to keep the housing 12 centered in the bore hole. The details of suitable means for mounting the pads 15 and 16 on the body 12 are fully disclosed on the aforementioned application of Doll and it will not be necessary to include a description of such means herein. Centered in the face of the pad 15 is a principal current electrode $A_0$ around which are concentrically placed a plurality of annular electrodes $M_1$, $M_1'$ and $A_1$. The face of the insulating pad 15 is continuously maintained in engagement with the walls of the bore hole 10, so as to insulate the electrodes electrically from direct contact with the liquid medium in the bore hole 10, the conductive drilling fluid 11, for example. An additional electrode 17 may be inserted in the face of the insulating back-up pad 16' to provide means for obtaining continuous indications of spontaneous potentials in the bore hole, as described in greater detail hereinafter.

Referring now to Fig. 2, which shows a preferred embodiment of an electrical circuit according to the invention, D. C. of substantially constant intensity from a suitable constant current source 18 at the surface, is continuously applied to the bore hole equipment through the insulated cable conductors 19 and 20.

At the bore hole equipment, the conductors 19 and 20 are connected to the movable contacts 21 and 22 of a switching relay 23 in the housing 12. When the movable contacts 21 and 22 are in the positions shown, the contact 21 engages a fixed contact 24 and the contact 22 engages a fixed contact 25. The contact 25 is connected to a ground point 26 at a relatively remote location with respect to the electrode $A_0$, e. g., the body 12. The contact 24 is connected through a biasing coil on the relay 23 and a conductor 28 to the electrode $A_0$. For this position of the relay 23, therefore, constant current of a given polarity passes between the electrode $A_0$ and the remote ground point 26. This constant current causes a potential difference to be created between the electrodes $M_1$ and $M_1'$, which potential difference is brought to the surface through the insulated conductors 29 and 30.

At the surface of the earth is disposed commutator means 31 divided into sections 32, 33, 34 and 35, shown partly in section, which are adapted to rotate in unison. With the commutator means 31 in the position shown, viz., in its first quarter cycle, the conductors 29 and 30 are connected through the commutator section 34 to the input conductors 36 and 38, respectively, of a high gain amplifier 37. The conductors 39 and 40, which carry the output of the amplifier 37, are connected through the commutator section 35, in the position shown, to the ground point 41 and to an insulated cable conductor 42, respectively. The lower end of the cable conductor 42 is connected through the main energizing coil 43 for the relay 23 to the auxiliary current electrode $A_1$. As will be understood, the amplifier 37 forms part of a negative feedback network and it supplies current to the electrode $A_1$ as required to maintain the potential difference between the electrodes $M_1$ and $M_1'$ substantially at zero.

Indications may be obtained of the potential difference between the electrode $M_1'$ and a ground point 44 by suitable means such as a high impedance recording type indicator 45, including a recording galvanometer 46 and a series impedance 47. The indicator 45 is adapted to be connected to the conductor 29 and to the ground point 44 only while the amplifier 37 is supplying current to the electrode $A_1$ (i. e., only during the first and third quarter cycles), the commutator section 33 being suitably designed to effect this result. As will be further understood from the copending application mentioned above, the reading of the indicator 45 will be indicative of the resistivities of the invaded zones surrounding the bore hole.

The commutator sections 34 and 35 are suitably designed to disconnect the amplifier 37 from the circuit so that no auxiliary current will be emitted by the electrode $A_1$ during the second and fourth quarter cycles of the commutator means 31. The movable contacts 21 and 22 on the relay 23, however, remain in the same position due to the self-biasing action of the coil 27. During the second and fourth quarter cycles, the potential difference between the electrode $M_1'$ and a ground point 48, for example, may be measured by means of a high impedance recording indicator 49, which may include a recording galvanometer 50 and a series impedance 51. The commutator section 32 is appropriately designed to connect the indicator 49 to the ground point 48 and to the conductor 29 only during the second and fourth quarter cycles. As will be understood with reference to the above cited copending application, the indicator 49 will provide indications of the formation resistivity at a very shallow depth of investigation and, therefore, will be affected appreciably by the presence of any mud cake on the wall of the bore hole.

During the third quarter cycle, the galvanometer 49 is disconnected from its circuit and the galvanometer 45 is reconnected in its circuit. However, construction of the commutator section 33 is such that the connections between the terminals of the indicator 45, the conductor 29 and the ground point 44 now are reversed. At the same time, the amplifier 37 is reconnected in its circuits, with both the input and output connections reversed, the commutator sections 34 and 35 being properly designed to accomplish this. Thus, the polarity of the current applied through the coil 43 is now reversed, and causes the movable contacts 21 and 22 to be brought into engagement with the fixed contacts 25 and 46, respectively, of the relay 23, despite the bias applied by the coil 27. Thus, the polarity of the current applied between the electrode $A_0$ and the ground point 26 is now reversed, although the polarity of current through the conductors 19 and 20 remains the same.

During the third and fourth quarter cycles of the commutator means 31, the connections between the indicators 45 and 49 and their respective circuits are reversed, as are the connections between the input and output terminals of the amplifier 37 and their respective circuits. It will be understood, therefore, that the readings of the indicators 45 and 49 and the input and output of the amplifier 37 are D. C. values due to the rectifying action of the commutator sections 32, 33, 34 and 35. At the end of the third quarter cycle when the current through the coil 43 is again shut off, the contacts 21 and 22 will remain in position as a result of the biasing action of the coil 27. Thus, it can be seen that means are conveniently provided for obtaining continuous, sequential and cyclical resistivity indications. At the same time, indications of spontaneous potentials may be obtained between the electrode 17 and a ground 52 by means of a high impedance indicating instrument 53, including a galvanometer 54 and a series resistor 55, connected between the ground 52 and a conductor 56.

For a better understanding of the operation of the embodiment shown in Fig. 2, reference is made to the graph of Fig. 3 on which are plotted certain of the currents and potentials for one complete cycle, the abscissae being time measured in degrees of rotation of the commutator 31 for one cycle, from 0° through 360°. At the beginning of a new cycle (0°), monitoring current of a first polarity is applied to the electrode $A_1$ through the relay coil 43, as shown in curve (A) of Fig. 3. This will reverse the polarity, with respect to a previous cycle, of the logging current applied through the biasing coil 27 to the electrode $A_0$ (curve (C)). Since the action of the relay 23 will not be instantaneous, there may be a lag of 2° or 3° after the start of a new cycle before the reversed polarity logging current is applied to the electrode $A_0$.

In order to allow time for transients to die out, the potential difference between the electrodes $M_1$ and $M_1'$ and the potential difference between the electrode $M_1'$ and the ground 44 are not applied to the amplifier 37 and the indicator 45, respectively, for a predetermined period after the beginning of a new cycle, say approximately 25°, as shown in the curve (B) of Fig. 3. As shown in the curve (D), the indicator 49 is not connected during the first quarter cycle.

At substantially the end of the first quarter cycle, the monitoring current is removed from the conductor 42 by means of the commutator section 35, as shown in the curve (A) of Fig. 3. The indicator 45 and the amplifying circuit 37 are disconnected immediately prior to the stoppage of the current flow through the conductor 42, as shown in the curve (B). However, as shown in the curve (C), the polarity and intensity of the logging current does not vary since the bias coil 27 maintains the switch contacts 21 and 22 in engagement with the contacts 24 and 25, respectively.

During the second quarter cycle (the period approximately 115° to 175°), the potential difference between the electrode M₁' and the ground 48 is detected by the indicator 49, as shown in the curve (D).

At the beginning of the third quarter cycle (180°), current of the opposite polarity is applied through the conductor 42 and the winding 43, reversing the relay 23, which in turn reverses the polarity of the logging current through the biasing coil 27 to the electrode A₀. During the third and fourth quarter cycles, therefore, the action is substantially the same as during the first two quarter cycles, except that the polarity of the currents passing through the conductors 29, 30 and 42 is reversed.

If desired, the A. C. signals picked up at the electrodes M₁ and M₁' may be converted to D. C. before transmission through the conductors 29 and 30, as shown in Fig. 2A. In this modification, the switching relay 23 may be provided with two additional contacts 57 and 58, movable in synchronism with the movable contacts 21 and 22, and three fixed contacts 59, 60 and 61. The contacts 59 and 61 are connected to the electrode M₁' by a conductor 62 and the contact 60 is connected to the electrode M₁ by the conductor 63.

From the foregoing description of the operation of the switching relay 23, it will be apparent that, during the first and second quarter cycles, the conductor 29 will be connected to the electrode M₁' through the contacts 57 and 59, and the conductor 62, and the conductor 30 will be connected to the electrode M₁ through the contacts 58 and 60 and the conductor 63. During the third and fourth quarter cycles, the movable contacts 57 and 58 will be in engagement with the fixed contacts 60 and 61, respectively. Accordingly, the conductor 29 will then be connected to the electrode M₁ through the contacts 57 and 60, and the conductor 63, and the conductor 30 will be connected to the electrode M₁' through the contacts 58 and 61, and the conductor 62. Thus, the A. C. signals picked up by the electrodes will be converted to D. C. for transmission through the conductors 29 and 30, thereby further reducing the capacitive cable effect.

The commutator sections 32, 33, 34 and 35 may be retained when the alternate switching relay arrangement of Fig. 2A is used. However, they would not have any reversing function but would be designed so as to connect the indicators 45 and 49 and the amplifier 37 to their respective circuits during the proper intervals, while eliminating undesirable transients.

It will appear obvious to those skilled in the art, that the present invention is not limited to the particular embodiments disclosed, but is subject to various modifications without departing from its spirit and scope as defined in the appended claims. For example, in order to convert the A. C. potentials picked up by the electrodes M₁ and M₁' to D. C. for transmission through the conductors 29 and 30, an additional relay operated in synchronism with the relay 23 may be utilized, instead of the modified relay shown in Fig. 2A.

Further, the invention is not limited to the highly effective electrical resistivity well logging method and apparatus disclosed in the aforementioned copending application, but it has a wide application in the remote operation of electrical equipment. It is particularly useful, however, in systems for electrical resistivity measurements simultaneously with automatically controlled resistivity measurements such as described in the aforementioned copending application and in the copending application Serial No. 161,641, filed May 12, 1950, for "Electrical Resistivity Well Logging Method and Apparatus," by H. G. Doll, now U. S. Patent No. 2,712,627, issued July 5, 1955, for example.

I claim:

1. In apparatus for investigating earth formations traversed by a bore hole, the combination of an electrode array adapted to be lowered into a bore hole and including at least two electrodes spaced apart longitudinally relative to the axis of the bore hole, feedback amplifier means having input terminals connected to receive the potential difference between two longitudinally spaced apart points in the vicinity of said electrodes and having output terminals connected to one of said electrodes and to a relatively remote reference point, switching means for periodically reversing the connections between said input terminals and the respective input circuits connected thereto and between said output terminals and the respective output circuits connected thereto, said amplifier means being adapted to maintain the potential difference between said spaced apart points substantially at a predetermined reference value, a direct current source of substantially constant magnitude at the surface of the earth, a pair of conductor means for transmitting direct current from said source to said electrode array, means at said electrode array operated in timed relation to said switching means for converting direct current received from said pair of conductor means to alternating current, means for supplying said alternating current to the other of said electrodes and to a reference point carried in the vicinity of said electrode array but electrically relatively remote from said other electrode, and means for providing indications at the surface of the potential difference between a reference point and a point in the vicinity of said electrodes.

2. In apparatus for investigating earth formations traversed by a bore hole, the combination of an electrode array adapted to be lowered into a bore hole and including at least two electrodes spaced apart longitudinally relative to the axis of the bore hole, feed-back amplifier means at the surface of the earth having input terminals connected to receive the potential difference between two points longitudinally spaced apart in the vicinity of said electrodes and having output terminals connected to one of said electrodes and to a relatively remote reference point, first switching means at the surface for periodically reversing the connections between said amplifier output terminals and the output circuit connected thereto, second switching means carried by said electrode array and operated in timed relation with said first switching means for periodically reversing the connections between said two points and the input circuit of said amplifier means, said amplifier means being adapted to maintain the potential difference between said points substantially at a predetermined reference value, a direct current source of substantially constant magnitude at the surface of the earth, a pair of conductor means for transmitting direct current from said source to said electrode array, third switching means carried by said electrode array and operated in timed relation to said first switching means for converting said direct current to alternating current by alternately switching said pair of conductor means between the other of said electrodes and a reference point in the vicinity of said electrode array but electrically relatively remote from said other of said electrodes, and indicating means for providing indications of potential difference between a point in the vicinity of said electrodes and a reference point.

3. In apparatus for investigating earth formations traversed by a bore hole, the combination of an electrode array adapted to be lowered into a bore hole and including at least two electrodes spaced apart longitudinally relative to the axis of the bore hole, feedback amplifier means located at the surface of the earth and having input terminals and output terminals, first periodically operable switching means located at the surface for connecting said amplifier input terminals in one relation to receive the potential difference between two points in the vicinity of said electrodes during successive first quarter cycles and in reversed relation to receive said potential difference during successive third quarter cycles, second periodically operable switching means located at the surface for connecting said amplifier output terminals in one relation to one of said electrodes and to a reference point during said first quarter cycles and in reversed relation to said one electrode and reference point during said third quarter cycles, a source of direct current of substantially constant magnitude at the surface of the earth, a pair of conductor means connecting said source to said electrode array, third switching means carried with said electrode array responsive to the current supplied to said one electrode and to said reference point for connecting said direct current source in one relation to the other of said electrodes and to a reference point movable with said electrode array but electrically relatively remote from said other of said electrodes at about the beginning of successive first quarter cycles and in reversed relation to said other electrode and to said reference point at about the beginning of successive third quarter cycles, means responsive to the current supplied to said other electrode for maintaining the connections between said direct current source and said one electrode and reference point in said one relation approximately to the end of each second quarter cycle and in said reversed relation approximately to the end of each fourth quarter cycle, first indicating means located at the surface, fourth switching means operated in timed relation with said first switching means for connecting said first indicating means in one relation to a point in the vicinity of said two points and to a reference point during at least part of said first quarter cycles and in reversed relation during at least part of said third quarter cycles located at the surface, second indicating means, and fifth switching means operated in timed relation to said first switching means for connecting said second indicating means in one relation to said point in the vicinity of said two points and to a reference point during at least part of each second quarter cycle and in reversed relation to said one point in the vicinity of said two points and to a reference point during at least part of each fourth quarter cycle.

4. In apparatus for investigating earth formations traversed by a bore hole containing a column of conductive liquid, the combination of an electrode array adapted to be lowered into the bore hole and including a plurality of ring-like electrodes disposed concentrically about a central electrode, means urging said electrodes substantially against and into electrical communication with the wall of the bore hole, means excluding direct electrical contact between said electrodes and the conductive bore hole liquid, feedback amplifier means located at the surface of the earth and having input terminals and output terminals, first periodically operable switching means located at the surface for connecting said amplifier means input terminals in one relation to two intermediate concentric electrodes in said array during successive first quarter cycles of the periodic operation and in reversed relation to said intermediate electrodes during successive third quarter cycles, second switching means located at the surface operated in timed relation to said first switching means for connecting said amplifier means output terminals in one relation to an outer concentric electrode in said array and to a relatively remote reference point during said first quarter cycles and in reversed relation to said outer electrode and to said reference point during said third quarter cycles, a source of direct current of substantially constant magnitude at the surface, two conductor means for supplying direct current from said source to said electrode array, third switching means responsive to the current supplied to said outer electrode for connecting said two conductor means in one relation to said central electrode and to a reference point carried with said electrode array but electrically relatively remote from said central electrode at about the beginning of each first quarter cycle and in reversed relation to said central electrode and reference point at about the beginning of each third quarter cycle, means responsive to the current supplied to said central electrode for maintaining the connections between said two conductor means and said central electrode and reference point in said one relation approximately to the end of each second quarter cycle and in said reversed relation approximately to the end of each fourth quarter cycle, first indicating means located at the surface, fourth switching means operated in timed relation to said first switching means for connecting said first indicating means in one relation to one of said intermediate electrodes and to a reference point during at least part of each first quarter cycle and in reversed relation to said one intermediate electrode and reference point during at least part of each third quarter cycle, second indicating means located at the surface, and fifth switching means operated in timed relation to said first switching means for connecting said second indicating means in one relation to one of said intermediate electrodes and to a reference point during at least part of each second quarter cycle and in reversed relation to said last-named intermediate electrode and reference point during at least part of each fourth quarter cycle.

5. In apparatus for investigating earth formations traversed by a bore hole, the combination of an electrical logging device adapted to be lowered through the bore hole, said device having first and second power circuits for establishing overlapping electric fields, respectively, in the earth formations surrounding the bore hole and a potential pickup circuit including a pair of spaced apart electrodes responsive to potentials produced by said overlapping electric fields, an energizing circuit including a source of unidirectional electric current at the surface of the earth and conductor means extending from said source to terminals at the location of said logging device in the well, first switching means at said logging device for making periodically reversed connections between said conductor means terminals and one of said power circuits to energize the same, control means comprising amplifier means at the surface of the earth having input terminals connected to input circuit means including a pair of conductors connected to said potential pickup circuit in the bore hole and havng output terminals connected to output circuit means including a conductor connected to the other of said power circuits, second switching means at the surface of the earth for periodically and simultaneously reversing the connections between said input circuit means and said amplifier input terminals, and between said output circuit means and said amplifier output terminals, means responsive to reversal of the current flow in said output circuit means conductor for operating said first switching means to reverse periodically the current supplied to said one power circuit in timed relation to the operation of said second switching means, potential indicating means at the surface of the earth, and third switching means at the surface operated in timed relation with said second switching means for making periodically reversed connections of said potential indicating means to one of the conductors comprising said pair and to a reference point.

6. Apparatus as defined in claim 5 for investigating earth formations traversed by a bore hole in which said first, second and third switching means are so phased that said potential indicating means makes its connections only during at least part of each cycle portion when both of said power circuits are being energized.

7. Apparatus as defined in claim 5 for investigating earth formations traversed by a bore hole together with second potential indicating means, and fourth switching means at the surface operated in timed relation with said second switching means for making periodically reversed connections of said second potential indicating means to one of the conductors comprising said pair and to a reference point, said first, second, third and fourth switching means being so phased that said third switching means makes its connections only during at least part of each cycle portion when both of said power circuits are being energized, while said fourth switching means makes its connections only during at least part of each cycle portion when only said one power circuit is being energized.

8. In apparatus for investigating earth formations traversed by a bore hole, the combination of an electrical logging array adapted to be lowered through a bore hole and including an electrically energizable means adapted to be energized from a remote current source for emitting current to establish an electrical field in said earth formations adjacent thereto, a source of unidirectional current of susbtantially constant magnitude located at the surface of the earth, a pair of conductor means connecting said source between said electrically energizable means and a reference point movable with said logging array but electrically remote from said electrically energizable means, control means located at the surface of the earth, means for connecting said control means between said logging array and a relatively remote reference point, switching means at the remote location of said control means for successively reversing the connection of said control means to said logging array and said relatively remote reference point, electrical potential measuring means, additional conductor means adapted to connect said electrical measuring means between two points at least one of which is located in the vicinity of said electrically energizable means and responsive to the electrical field established thereby, additional switching means located at said logging array for successively reversing the connections between said electrical measuring means and said two points, polarity reversing means located at said logging array for successively reversing the connections of said pair of conductor means to said electrically energizable means and said electrically remote reference point, and means for controlling the operation of said polarity reversing means and said additional switching means in synchronism with said first-mentioned switching means.

References Cited in the file of this patent

UNITED STATES PATENTS

| | | |
|---|---|---|
| 2,268,137 | Evjen | Dec. 20, 1941 |
| 2,294,395 | Evjen | Sept. 1, 1942 |
| 2,347,794 | Piety | May 2, 1944 |
| 2,619,520 | Nichols | Nov. 25, 1952 |
| 2,669,688 | Doll | Feb. 16, 1954 |
| 2,669,689 | Doll | Feb. 16, 1954 |

UNITED STATES PATENT OFFICE

CERTIFICATE OF CORRECTION

Patent No. 2,813,248                                              November 12, 1957

Maurice C. Ferre

It is hereby certified that error appears in the printed specification of the above numbered patent requiring correction and that the said Letters Patent should read as corrected below.

Column 7, line 2, before "reference" insert -- relatively remote --; lines 30 and 31, strike out "located at the surface" and insert the same in line 31, same column, after "means" and before the comma.

Signed and sealed this 31st day of December 1957.

(SEAL)
Attest:
KARL H. AXLINE

Attesting Officer

ROBERT C. WATSON
Commissioner of Patents